Dec. 31, 1963 F. LEIGHTON 3,116,095
DOUBLE-CHECK QUICK RELIEF COMBINATION VALVE
FOR AIR BRAKE SYSTEMS
Filed Aug. 11, 1961 2 Sheets-Sheet 1
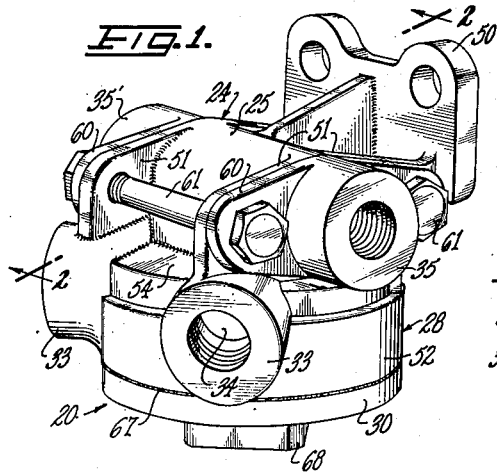
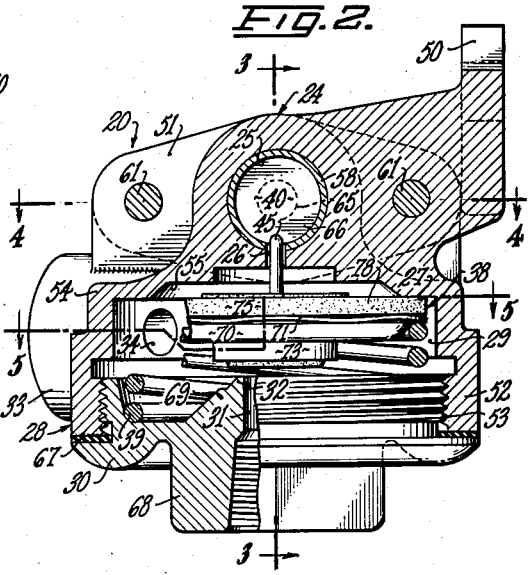
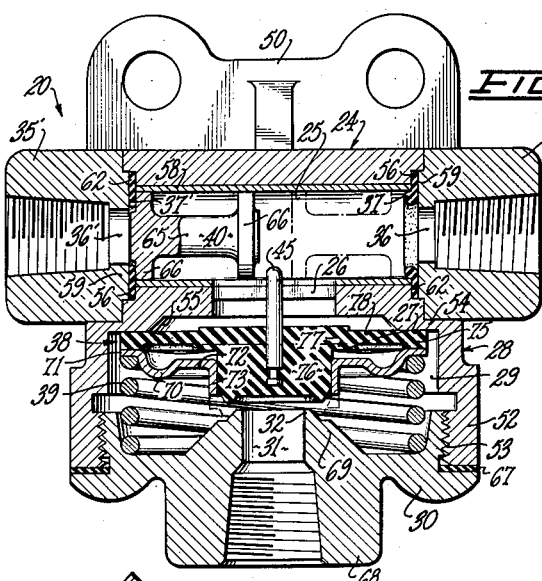
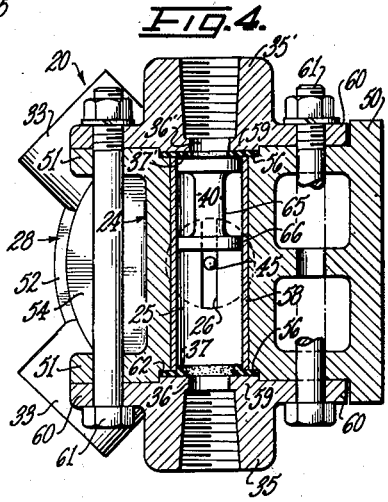
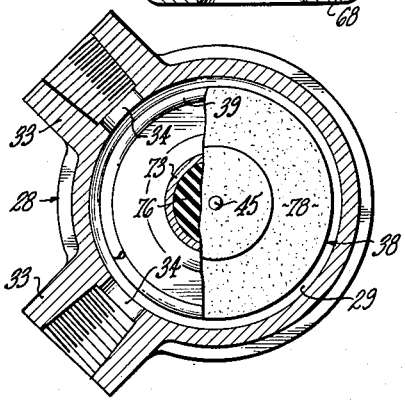
INVENTOR.
FRANCIS LEIGHTON
BY
*Sellers and Latta*
ATTORNEYS Dec. 31, 1963  F. LEIGHTON  3,116,095
DOUBLE-CHECK QUICK RELIEF COMBINATION VALVE
FOR AIR BRAKE SYSTEMS
Filed Aug. 11, 1961  2 Sheets-Sheet 2
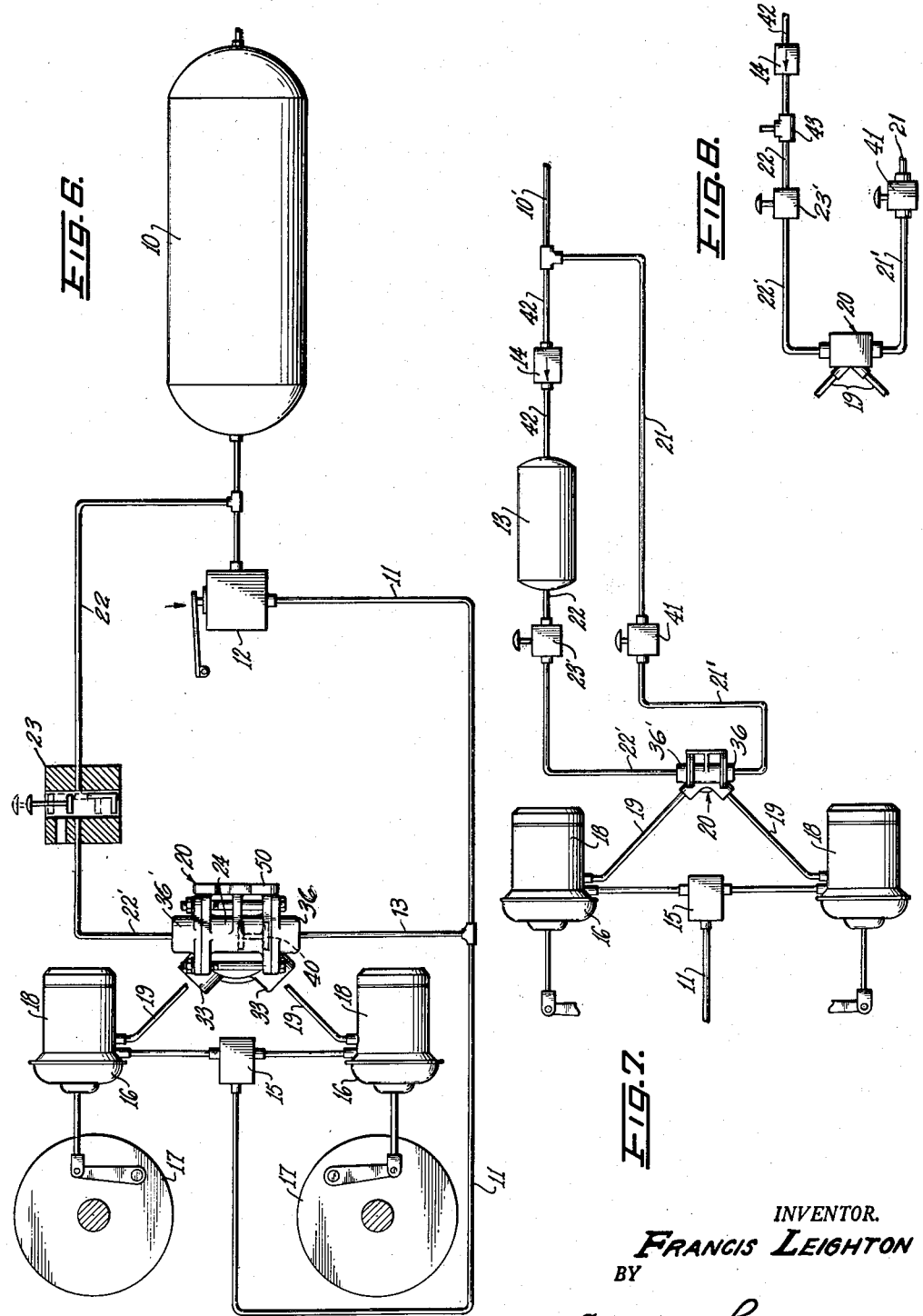
INVENTOR.
FRANCIS LEIGHTON
BY
Sellers and Latta, ATTORNEYS

United States Patent Office 3,116,095
Patented Dec. 31, 1963

3,116,095
DOUBLE-CHECK QUICK RELIEF COMBINATION VALVE FOR AIR BRAKE SYSTEMS
Francis Leighton, Encino, Calif., assignors to Crane Co., doing business as Hydro-Aire Company, Burbank, Calif., a corporation of Illinois
Filed Aug. 11, 1961, Ser. No. 130,861
9 Claims. (Cl. 303—9)

This invention relates generally to air brake systems such as are used on motor vehicles, for example, on freight-carrying highway trucks. Among other applications, the invention may be utilized in air brake systems having air pressure-energized service brakes for normal braking operations, and, in addition, spring energized parking and emergency brakes normally maintained inoperative by air pressure energized restraint of their actuator springs. The invention relates more specifically to the problem of controlling the parking brakes in satisfactorily correlated relation to the service brakes, and provides an improved control valve for such an operation.

Parking-emergency brakes of this type have several useful functions, i.e. (1) to apply the brakes for parking after a vehicle has been stopped and its air compressor shut down; and (2) to automatically apply the brakes in the event of failure of service line pressure when the vehicle is moving, so as to avoid loss of control of the vehicle in the event such failure should occur while descending a hill. Such automatic application of the brakes, however, creates a new problem, namely that of releasing the parking-emergency brakes when it is desired to move the vehicle. Where service line pressure is available, the brakes can be released by applying air pressure from the service line. Under conditions where it may be undesirable to start the compressor or where service line pressure has failed through malfunctioning, it may be desirable or necessary to utilize a supplemental or emergency source of air for effecting release of the brakes. With the foregoing in mind, the general object of the present invention is to provide an air brake system and a quick release valve therefor, providing maximum control over the brakes under all conditions, and maximum facility and speed of effecting such control. The invention has numerous specific objects, including: (1) In the event of failure of service air pressure, to route emergency air to parking brakes upon driver demand, so that the vehicle can be moved; (2) When a vehicle is to be moved during cold weather and or the engine or compressor is not to be started, to maintain parking brake actuators inoperative; (3) To maintain parking brakes inoperative during piggy-back transportation of a truck or trailer on another vehicle; (4) To facilitate installation of parking brake actuators by inflation from a pressure source other than the service brake pressure line; (5) To prevent double-brake application (arising from adding the force of the parking-emergency brake actuator springs to the force of air pressure in the service brake actuators); (6) To avoid the inconvenience and danger of crawling under a vehicle to accomplish emergency brake release; (7) Under normal conditions, to effect automatic return to normal service brake operating conditions after emergency or parking brake application; (8) In addition, to provide the function of a common quick release valve for immediate brake application.

Other objects and advantages will become apparent in the ensuing applications and appended drawings, in which:

FIG. 1 is a perspective view of a valve embodying the invention;

FIG. 2 is a transverse sectional view thereof taken on line 2—2 of FIG. 1;

FIG. 3 is a longitudinal sectional view taken on the line 3—3 of FIG. 2;

FIG. 4 is a longitudinal sectional view taken on the line 4—4 of FIG. 2;

FIG. 5 is a sectional view taken on the line 5—5 of FIG. 2;

FIG. 6 is a schematic plan view of a braking system embodying the invention;

FIG. 7 is a schematic plan of a braking system embodying a modified form of the invention; and FIG. 8 is a fragmentary schematic diagram of a further modified form of braking system embodying the invention.

DESCRIPTION OF INVENTION

*The braking system.*—Referring now to the drawings in detail, and in particular to FIG. 6, there is shown therein, as an example of one application of the invention, a combined service brake and parking-emergency brake system adapted to prevent double application of braking pressure, wherein a service line reservoir 10, pressurized from a compressor, supplies air to a service brake line 11 through a service brake control valve 12, and wherein emergency air is supplied to an emergency line 22, 22'. From the service line 11, air is supplied through a conventional quick release of relay valve 15 to a pair of conventional service brake actuators 16 through which the brakes 17 are normally operated to braking positions by the application of air pressure in the actuators 16. Cooperating with the actuators 16 are spring powered auxiliary actuators 18 for parking brake actuation and emergency actuation in the event of failure of pressure in the service line 11. Air pressure for retracting the actuators 18 and maintaining them normally inoperative, is supplied through a pair of pressurizing lines 19 coming from my quick release dual check valve unit which is indicated generally at 20. During normal braking operations when service line pressure is available, air is supplied to the pressurizing lines 19 from the service line 11 through a line 13 branching from the service line 11 and directing air through the valve unit 20. Air may be supplied to the pressurizing lines 19 (under operator control) from the reservoir 10 through an emergency air supply line 22, 22' and a dash-mounted, manually operable emergency parking brake control valve 23 in line 22, 22'. Valve 23 has one position in which it will direct air from the reservoir 10 into the dual check valve unit 20 and thence through lines 19 into the parking brake actuators 18 for inactivating them. It may have an alternate position in which it blocks off the connection to reservoir 10a and establishes a dumping connection between dual check valve unit 20 and atmosphere, with the result that the pressure in actuators 18 will be released and the brakes will be set.

For the purpose of illustration, the valve 23 in FIG. 6 is shown schematically to indicate an internal construction providing for its required functions, its normal position being indicated in full lines and its dumping position being indicated in dotted lines.

*Manually controlled emergency braking system—FIG. 7.*—Referring now to FIG. 7, the system shown therein has a self-contained emergency pressurized air supply in an emergency reservoir 13, and for controlling the same it utilizes a valve 23' which functions merely as a repressurizing brake-release valve, for controlling release of the parking brakes after they have been set (as in an emergency braking operation). This system utilizes a separate dash-mounted control valve 41 in a pressure supply line 21, 21' for effecting emergency brake operation by manual control. In this arrangement, pressurized air from a suitable source (e.g. a service reservoir) is supplied through a reservoir line 10', which supplies air to a branch line 42 which feeds the emergency reservoir 13 through a check valve 14. Check valve 14 prevents loss of pressure in emergency reservoir 13 when the compressor system is shut down and pressure in the main reservoir 10 is exhausted.

Emergency control valve 41 has a normal position (to which it may be self-returning) in which it maintains the line 21, 21' sealed from atmosphere and open for the flow of pressurized air to the actuation 18; and an alternative position in which it blocks off the connection to reservoir line 10' and opens line 21' to atmosphere to apply the parking or emergency brakes.

*Emergency braking, in general.*—In emergency braking, maximum rapidity of brake application may be attained by having a close-coupled relation between the valve unit 20 and the actuators 18, so that the air need travel only a short distance from the actuators 18 to the exhaust port 31 of valve unit 20, through which it is dumped. The emergency braking response thus attained is considerably faster than can be obtained by dumping the air from the parking brakes through a dump valve located in the operator's cab, with the requirement that the escaping air pass all the way back to the cab before it is released. At the same time, the dumping can be manually controlled in the cab by the emergency control valve 41, which may be the same as valve 23 of FIG. 6.

*Emergency release by external pressurized air—FIG. 8.*—In lieu of the emergency reservoir 13 of FIG. 7, the modified system of FIG. 8 utilizes a Schrader type valve 43 interposed between a check valve 14 and an emergency control valve 23' functioning similarly to the valve 41 of FIG. 7. In the event of a failure of pressure in the supply line 42, air from an external source, such as a filling station air line, can be introduced into emergency line 22, 22' through the valve 43, the check valve 14 closing behind the valve 43, to direct the pressurized external air into the valve unit 20 through the control valve 23' (providing an atmosphere-sealed through connection between line sections 22, 22' the same as the functioning of valve 41 in line 21, 21' of FIG. 7, in its normal position). Manual actuation of valve 41, blocking off line section 21, 21' from line 10' and releasing pressure in line section 21, 21' to atmosphere to depressurize actuators 18, may be the same as in the system of FIG. 7.

*The quick release-dual valve.*—Referring now to FIGS. 1–5, there is shown therein an example of one form in which the improved dual check valve unit 20 may be embodied. Valve unit 20 comprises a casing including a sleeve portion 24 providing a shuttle valve cylinder 25 having a transfer port 26 in its lateral wall intermediate its ends, a check valve seat 27 around the port 26 externally of the cylinder 25, and a drum-shaped transfer housing 28 extending radially from sleeve portion 24 and defining a transfer chamber 29 communicating with the check valve seat 27. A cap 30 on the outer end of transfer housing 28 has an exhaust port 31 and a release valve seat 32 around the exhaust port 31 within the transfer chamber 29 in opposed relation to the check valve seat 27. A pair of lateral bosses 33 are provided on casing portion 28, having therein respective connecting ports 34 and suitable means, such as the illustrated internal threads, for connection to the respective parking brake lines 19. A pair of inlet port fittings 35, 35' are attached to the respective ends of sleeve 24 and provided with respective inlet ports 36, 36' with suitable means such as the illustrated internal threads, for connection to the respective air supply lines 13, 21', 22' and with shuttle valve seats 37, 37' around the respective inlet ports 36, 36' within the cylinder 25. A dual-check release valve closure unit 38 is disposed in the transfer chamber 29 and movable between the release valve seat 32 and the check valve seat 27 for alternative seating engagement therewith. A coil spring 39 spring-loads the closure unit 38 to a position seated on the check valve seat 27 to check flow of air from the transfer chamber 29 to the shuttle cylinder 25. A shuttle valve poppet 40 is slidable in the cylinder 25 between positions seated against the respective shuttle seats 37, 37', responsive to pressure in either of the inlet ports 36, 36' to move to an open position with respect to the respective valve seat 37 or 37', so as to admit air from the pressurized inlet port 36 or 36' into the shuttle cylinder 25 and the transfer port 26, unseating the check valve closure 38 from the release valve seat 27, thereby admitting the air into the transfer chamber 29 and seating check valve closure 38 against the release valve seat 32 so as to close the exhaust port 31 and direct the air through the connecting ports 34 to the respective actuators 18 for releasing the parking brakes.

A latch finger 45 functions normally to restrain poppet 40 from assuming a position obstructing the dumping of air from actuators 18 in a parking or emergency braking operation.

The valve casing consists in a central main body section comprising the shuttle sleeve portion 24 and transfer housing portion 28; the two end fittings 35, 35' and the end cap 30. The main body section includes also an integral bracket portion 50 joined to one side of shuttle cylinder sleeve 24, flush with the ends thereof (defined by mounting ears 51) in planes normal to the longitudinal axis of cylinder 24. The connecting port bosses 33 are likewise formed integrally with this main casing section, extending radially from the axis of transfer housing 28. The axis of housing portion 28 extends radially from the axis of cylinder 25, intersecting the same. Transfer housing 28 includes a cylindrical skirt portion 52, internally threaded at 53, and a head portion 54 integrally joined to the side of sleeve portion 24 and to the ears 51. Check valve seat 27 is formed as an inner planar face of head 54. Within head 54, concentric with check valve seat 27, is a counterbored recess 55 which provides communication between the valve seat 27 and the transfer port 26, and receives the central portion of check valve closure 38.

In the respective ends of shuttle sleeve 24 are shallow counterbores 56. A thin cylindrical liner sleeve 58 is cast or press-fitted in the bore of casing sleeve portion 24 to define the inner wall of cylinder 25 and to provide a smooth, hard, wear-resistant accurately finished surface for said inner wall. The transfer port 26 is in the form of an elongated, narrow slot, parallel to the axis of cylinder 25 (see FIG. 4). Port 26 extends through the walls of both sleeve members 24 and 58. Inlet port fittings 35, 35' are provided at their inner ends with necked-down pilots 59, received in counterbores 56, and with radially extending ears 60 matched to ears 51 and secured thereto by bolts 61 extending through registering apertures in the respective pairs of ears. The fittings 35, 35' are sealed to the respective ends of sleeve portion 24 by gaskets 62 clamped between the pilots 59 and the counterbored ends of sleeve portion 24. Valve seats 37, 37' are formed as integral beads on the inner margins of the respective gaskets 62. The pilots 59 extend inwardly to a diameter sufficiently smaller than that of cylinder 25 so as to provide full supporting contact with the outward faces of the valve seat-gasket rings.

End cap 30 is appropriately constructed as indicated for threading into the threaded mouth 53 of casing skirt 52, and for clamping a gasket 67 against the end of skirt 52 to provide a hermetic seal between the cap and the casing. Cap 30 also includes an integral end fitting 68 which may be internally threaded as indicated for connection to an exhaust line, if desired. As indicated in FIG. 1, boss 68 may have a squared external periphery for wrenching purposes. Valve seat 32 is formed as the inward extremity of a conical inward extension 69 of cap 30, an annular recess to accommodate the spring 39 being defined between the extension 69 and the threaded rim of the cap.

The shuttle valve poppet 40 is of spool form, including a central waist portion 65 of reduced diameter and disclike heads 66 at its respective ends, for seating against the respective valve seats 37, 37'. Heads 66 are fitted to the inner wall of cylinder 25 with a free-sliding tolerance.

Check valve closure 38 per se, is generally of conventional construction, comprising a stamped sheet metal frame 70 of shallow dish form having a rim 71 disposed generally in a radial plane but with a shallow axially undulating deviation from such radial plane, of "marcel wave" configuration as best shown in FIG. 2; a flat radial intermediate web 72, offset below the level of the plane of rim 71; and a cylindrical inward collar 73. Valve closure 38 further includes a valve body of soft, resilient material such as soft rubber (either natural or synthetic) or equivalent synthetic resin plastic material, comprising a rim 75 having a flat rear face seated upon the crests of the undulations of the frame rim 71, having a cylindrical central closure head 76, with a free sliding fit in the collar 73, having an intermediate shoulder 77 which is spaced from the frame web 72 when the valve poppet is not subjected to air pressure in transfer port 26, and including a relatively thin flat diaphragm portion 78 adapted to deflect under pressure exerted against the valve body in the transfer port 26, its deflection being limited by the seating of shoulder 77 against web 72.

The spacing between shoulder 77 and web 72 is as great or greater than the spacing between the end face of valve head 76 and valve seat 32, so that the closing of exhaust port 31 can be effected by the deflection of valve diaphragm 78 without unseating its rim 75 from check valve seat 27. Thus it becomes possible to build up and maintain pressure in transfer chamber 29 and in connecting ports 34 and parking brake pressurizing lines 19. When a large pressure differential exists between shuttle valve chamber 25 and transfer chamber 29, as at the beginning of a re-pressurizing cycle following the release of pressure in the actuators 18 and application of the brakes, the check valve closure 38 may be completely unseated from its seat 27 for a short period of time until the pressure commences to equalize, and the closure 38 may then return to its seat 27 but thereafter permit a slow bleed of additional air pressure into transfer chamber 29 by slight deflection of circumferentially spaced portions of its rim 75 into the valleys between the crests of marcel-wave rim 71 of its frame (e.g. to compensate for any slow escape of pressure from actuators 18).

Latch finger 45 is in the form of a pin having an annularly grooved shank portion embedded in the valve head 76 on the axis thereof. The pin projects through the transfer port 26, and in the undeflected condition of the closure diaphragm 78, the tip of the finger 45 is disposed in obstructing relation to the shuttle valve poppet 40 so as to confine it in one end of the cylinder 25. For example, when through the application of emergency air pressure in port 36', the poppet 40 has been shifted to its alternate position shown in broken lines in FIG. 3, obstructing inlet port 36, the latch finger 45 will prevent return of the poppet 40 to its position adjacent port 36' at such time as closure 38 may assume the dumping position shown in FIG. 3. Similarly, when emergency air inlet port 36' is unpressurized and service line pressure is applied to port 36, the poppet 40, if located in the alternate position shown in broken lines, will be propelled back to its normal position adjacent emergency air inlet port 36', and a subsequent return of closure 38 to its dumping position of FIG. 3 will effect latching of the poppet in its normal (full line) position. At this point it should be noted that the movement from one position to the other is accomplished at a time when the closure diaphragm 78 is deflected under pressure applied thereto in transfer port 26, at which time the latch finger 45 will be withdrawn from cylinder 25 so that the poppet 40 can freely pass the end of the latch finger. The poppet 40 will then be propelled over to a position adjacent the opposite inlet port and will remain in that position while the parking brakes are being retracted by the applied air pressure to effect brake release. When poppet 40 is seated against a seat 37' or 37, its inner end (head 66) is spaced from latch finger 45 as shown in FIG. 3, providing lost motion of the poppet toward finger 45 before contact therewith is made.

OPERATION

*Operation of FIG. 6 system.*—In this system, pressurized air from source 10, transmitted through line 22, 22', port 36' of valve 20, and lines 19, will normally maintain actuators 18 inoperative, the poppet 40, in response to this air pressure, being held in its position closing port 36 and thus sealing the valve 20 from loss of air into line 21 which is normally unpressurized.

If pressure should fail in the service reservoir 10 through failure of the compressor or for any other reason, the corresponding failure of pressure in inlet port 36' and within shuttle valve chamber 25 will result in unseating the check valve closure 38 from the release valve seat 32, thus opening the exhaust port 31 so as to release the pressure in transfer chamber 29, parking brake pressurizing lines 19, and actuators 18, resulting in the automatic spring-energized actuation of the brakes 17.

For parking purposes, valve 23 can be manually actuated to dump the pressure from actuators 18 to set the brakes. This will be done when service line 11 is unpressurized, and the poppet 40 will therefore remain in its normal position, leaving port 36' open for the dumping.

*Prevention of double brake actuation.*—Normally, when pedal valve 12 is opened and the service brakes are actuated by the resulting pressurizing of line 11, the existing pressure in lines 22', 19 and in valve 20 will be sufficient to maintain poppet 40 in its normal position adjacent port 36. However, in the event that the operator should actuate valve 23 to its dumping position while the service brakes are thus being actuated, the pressure in line 21 and in port 36 of valve 20 will exceed the reduced pressure in line 22' and port 36' causing the poppet 40 to travel to the opposite end of valve cylinder 25 and to seal off port 36' so as to prevent the escape of air from actuators 18. Thus double actuation (spring pressure added to air pressure) will be prevented. However, when the brake pedal is released and service line 11 is again depressurized, poppet 40 will be returned to its normal position whenever pressure is restablished in line 22' (as by returning valve 23 to its normal position) and pressure in lines 19 can then escape through dump valve 23 when it is re-actuated to dumping position.

In FIGS. 7 and 8, poppet 40 will normally close port 36' and provide pressure to actuators 18 from line 21 through valve 41, positioned to provide a through connection in line 21, 21' from pressure source 10'. Line 22' will be normally unpressurized. On failure of pressure at source 10', poppet 40 will remain in its normal position and air will escape from lines 19, causing actuators 18 to become operative. Actuators can later be inactivated (to release the brakes) by pressure from line 21 (upon restoration of pressure at source 10') or by auxiliary pressurization from emergency tank 13, by opening valve 23'. In this alternative brake-releasing operation, poppet 40 will shift away from its normal position at port 36' so as to permit air from line 22' to enter lines 19.

*Latching operation.*—In the normal course of events, a failure of pressure in the service line will be dealt with by the operator or a service man (e.g. in a repair operation) to effect restoration of service pressure therein. In the absence of the latching finger 45, in the system of FIG. 6, this would result in a return of the piston 40 back to the emergency port 36' in response to release of pressure in line 22' through dumping control action of valve 23 or 23'. Even though the service brake valve 12 may be closed, so as to block off the supply of pressure from service reservoir 10, the residual body of air in the service line 11 would be sufficient, upon release of pressure from line 22', to maintain the pressurization of the actuators 18 and defeat the attempt to dump the pressure therefrom, in an attempt to quickly apply the emergency brakes. Under these conditions, the latch finger 45 becomes operative to latch the poppet 40 in its broken-line position blocking service port 36 and preventing the poppet from returning to port 36' and from sealing the same so as to prevent the outflow of air.

In the system of FIG. 7, the poppet 40 will normally remain in its full line position of FIG. 3, adjacent inlet port 36', in response to pressure applied in inlet port 36. Residual pressure (may be nearly as high as service line pressure) will also normally exist in emergency air line 22', even though poppet 40 is seated on the seat 37'. Such residual pressure may be a residue of emergency air previously applied through line 22, or may be the result of seepage from the high pressure air normally existing in cylinder 25. When valve 41 is opened to release the pressure from cylinder 25 so as to trigger a dumping operation, the differential between the residual pressure in port 36' and the lowered pressure in port 36 (when valve 41 is opened for dumping) will tend to propel poppet 40 to its alternate position closing port 36, and the dumping operation can be defeated if this is allowed to happen. However, the response of diaphragm 78 to the corresponding differential of high pressure in transfer chamber 29 over the lowered pressure in port 36, will be more instantaneous than that of poppet 40, due to the much greater effective area of the diaphragm acted upon by the pressure differential. As the result of the slower acceleration of poppet 40, the lost motion in its travel before it reaches latch finger 45, and the shorter distance that the tip of latch finger 45 has to move in order to engage the adjacent end of advancing poppet 40, the finger 45 will be in blocking position before the poppet reaches that position. The deflection loading and inherent resiliency of diaphragm 78 also assist in its quick return to undeflected position. Even though the latch finger 45 should fail to catch the leading end of poppet 40, it will inevitably block the trailing end by moving into the space between the two heads 66, thus restraining the poppet from attaining seating engagement with port 36. Under normal conditions, finger 45 will engage the poppet 40 at its leading end so as to retain it substantially in its normal full line position of FIG. 3, thus providing for unrestricted escape of control air from the cylinder 25 through port 36 and correspondingly unimpeded dumping through the opened exhaust port 31.

When a dumping operation has been completed and a subsequent repressurizing operation is initiated, the application of pressure in the inlet port 36 through the service line branch connection 21, or of emergency air pressure through line 22', will instantaneously move the closure 38 to its distended position closing the exhaust port 31, repressurizing transfer chamber 29, connecting ports 34 and parking brake lines 19, returning poppet 40 to port 36', and retracting latch finger 45 to its inoperative position, all as indicated in the broken line showing of closure 38 in FIG. 3.

In dumping operations under control of valve 23 of FIG. 6, the initial release of pressure in port 36' by the dumping control action will be sensed by the diaphragm 78 which will quickly return to its undeflected position, projecting latch finger 45 into obstructing relation to the poppet 40, before the latter can travel appreciably toward the port 36'. Thus the poppet 40 is latched in its position adjacent inlet port 36 and preventing the residual pressure in the service line from projecting the poppet 40 into closing relation to port 36'. It will be apparent that if the poppet 40 were permitted to close port 36' before any substantial amount of the stored pressure in the actuators, the pressurizing line 19 and the transfer chamber 29 had been released, and if the residual pressure had been permitted to reclose the poppet valve 38 over exhaust port 31 after the initial effect of releasing pressure in line 22' had been overcome by the return of poppet 40 to closing relation to port 36', that the valve unit 20 would be locked in pressurized condition by the residual line pressure, despite the dropping of pressure in emergency port 36' down to the atmospheric level.

I claim:

1. In a dual-check release valve unit for an air brake system including an air pressure-energized service brake actuator and a spring-energized parking brake actuator normally maintained inoperative in response to air pressure applied thereto, in combination: a casing including means defining a shuttle valve cylinder having a transfer port in its lateral wall intermediate its ends, a check valve seat around said transfer port externally of said cylinder, a transfer chamber communicating with said seat, an exhaust port in the outer end of said transfer chamber, a release valve seat around said exhaust port within said transfer chamber in opposed relation to said check valve seat, a connecting port communicating with said transfer chamber, for connection to said parking brake actuator to supply air pressure thereto for maintaining it inoperative, inlet ports at the respective ends of said cylinder, for connection to respective air pressure lines at least one of which is an emergency air pressure line, and shuttle valve seats around the respective inlet ports within said cylinder; a dual check release valve closure unit disposed in said transfer chamber and movable between said release valve seat and said check valve seat for alternative seating engagement therewith; means spring loading said closure unit to a position seated on said check valve seat to check flow of air from the transfer chamber to said shuttle valve cylinder, said closure unit including means acting in response to air pressure in the transfer port, to engage said release valve seat to close the exhaust port for pressurizing the transfer chamber, and, when unseated from the release valve seat, providing open communication through the transfer chamber between the connecting port and the exhaust port for dumping air pressure from the parking brake actuator so as to effect spring-energized actuation of the brake; a shuttle valve poppet slidable in said cylinder between positions seated against the respective shuttle valve seats, responsive to pressure in either of said inlet ports to move to an open position with respect to the respective shuttle valve seat thereof, so as to admit air from the pressurized inlet port into the shuttle cylinder and said transfer port, unseating said check valve closure from the check valve seat, thereby admitting air into the transfer chamber and seating said check valve closure against the release valve seat so as to close said exhaust port and to direct the air through the connecting port to the respective actuators for releasing the parking brakes.

2. In an air brake system, in combination: a service brake actuator utilizing air pressure for applying a brake; a spring-energized parking brake actuator utilizing fluid pressure for normally maintaining an actuator spring thereof inoperative; a pair of air pressure lines, at least one of which is an emergency air pressure line; and a dual-check release valve unit comprising a casing including means defining a shuttle valve cylinder having a transfer port in its lateral wall intermediate its ends, a check valve seat around said transfer port externally of said cylinder, a drum-shaped transfer chamber communicating with said seat and projecting radially from said cylinder, an exhaust port in the outer end of said transfer chamber, a release valve seat around said exhaust port within said transfer chamber in opposed relation to said check valve seat, a connecting port in the lateral wall of said transfer chamber, for connection to said parking brake actuator to supply air pressure thereto for maintaining it inoperative, inlet ports at the respective ends of said cylinder, connected to said air pressure lines respectively, and shuttle valve seats around the respective inlet ports within said cylinder; a dual check release valve closure unit disposed in said transfer chamber and movable radially between said release valve seat and said check valve seat for alternative seating engagement therewith; means spring loading said closure unit to a position seated on said check valve seat to check flow of air from the transfer chamber to said shuttle valve cylinder, said closure unit including means acting in response to air pressure in the transfer port, to engage said release valve seat to close the exhaust port for pressurizing the transfer chamber, and, when unseated from the release valve seat, providing open communication through the transfer chamber between the connecting port and the exhaust port for dumping air pressure from the parking brake actuator so as to effect spring-energized actuation of the brake; a shuttle valve poppet slidable in said cylinder between positions seated against the respective shuttle valve seats, responsive to pressure in either of said inlet ports to move to an open position with respect to the respective shuttle valve seats thereof, so as to admit air from the pressurized inlet port into the shuttle cylinder and said transfer port, unseating said check valve closure from the check valve seat, thereby admitting air into the transfer chamber and seating said check valve closure against the release valve seat so as to close said exhaust port and to direct the air through the connecting port to the respective actuators for releasing the parking brakes.

3. Apparatus as defined in claim 2, wherein the other air pressure line is a service air pressure line and wherein said emergency air pressure line is connected to one of said inlet ports, the other inlet port being connected to said service air pressure line; and an emergency brake release valve in said emergency line, operable to a position for admitting pressure from said emergency line into said valve unit for emergency pressurizing of said parking brake actuators; said shuttle valve poppet, in response to said emergency air pressure in said one inlet port, moving toward the other inlet port to accommodate the inflow of emergency air into said valve unit.

4. A system as defined in claim 3, including an emergency air reservoir connected to said emergency air pressure line and arranged to be supplied with air from an air pressure source.

5. A system as defined in claim 2, wherein said emergency air pressure line is provided with a Schrader type valve for injection of emergency air into said dual-check release valve unit through said emergency air pressure line, said poppet, in response to said injection of emergency air, moving toward the opposite end of the cylinder from the inlet port thereof connected to said emergency air pressure line.

6. A system as defined in claim 2, including a manually controlled release valve in one of said air pressure lines, for releasing pressure from said cylinder and thereby effecting the unseating of said valve closure from said exhaust valve port so as to dump the pressure from said parking brake actuators and thereby effect the spring energized setting of parking brakes.

7. A system as defined in claim 2, including a manually controlled release valve in one of said air pressure lines, for releasing pressure from said cylinder and thereby effecting the unseating of said valve closure from said exhaust valve port so as to dump the pressure from said parking brake actuators and thereby effect the spring energized setting of parking brakes; said dual-check release valve unit further including a latching finger mounted in the center of said valve closure unit on the side thereof facing said transfer port, and projecting through said transfer port for blocking engagement with said poppet to prevent seating thereof in closing relation to the inlet port in which the pressure is released for said dumping, when said closure unit is unseated from said release port, whereby to maintain said dumping action.

8. A valve as defined in claim 1, including a latching finger carried by said valve closure at the center thereof on the side facing said transfer port, and projecting into said transfer port for blocking engagement with said valve poppet to prevent the latter from shifting from one end of said cylinder to the other.

9. A braking system as defined in claim 2, including a valve in said emergency air pressure line for admitting air pressure therefrom into one of said inlet ports for emergency pressurization of said actuators, and a parking brake release valve in the other air pressure line, for releasing pressure from said cylinder through the other of said inlet ports to effect unseating of said closure unit from said exhaust port and consequent dumping of pressure from said parking brake actuators to effect spring energized setting of the parking brakes, said valve unit further including a latching finger carried thereby on the side facing said transfer port and projecting through said transfer port when said closure unit is unseated from said exhaust port, into blocking relation to said shuttle valve poppet, to hold the same in open relation to said other port during the release of pressure therefrom so as to maintain said dumping action.

References Cited in the file of this patent

UNITED STATES PATENTS

| | | |
|---|---|---|
| 2,645,307 | Stegman | July 14, 1953 |
| 3,011,834 | Casey | Dec. 5, 1961 |